May 16, 1933. P. NASHAN 1,909,215
PROCESS FOR THE MANUFACTURE OF FORMALDEHYDE FROM METHANE
Filed Jan. 6, 1930
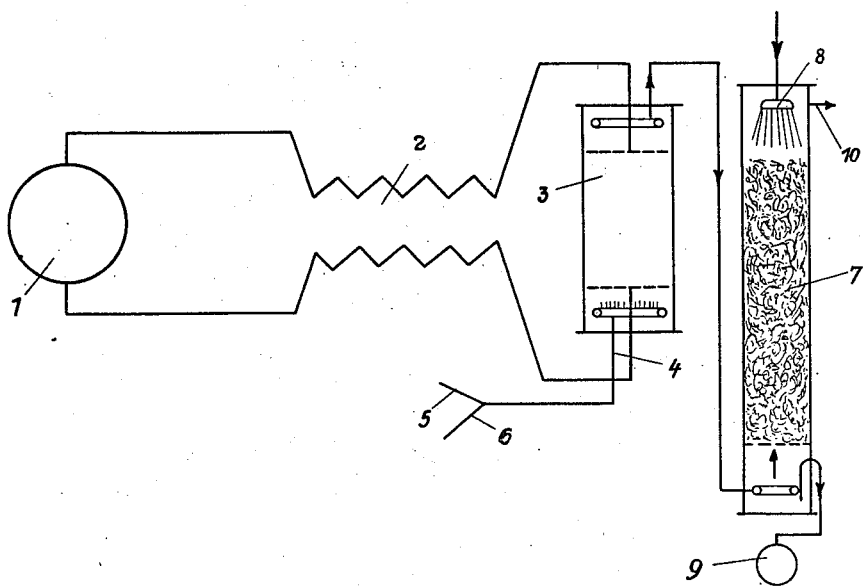
Inventor:
Paul Nashan.
B. Singer. Atty Patented May 16, 1933

1,909,215

UNITED STATES PATENT OFFICE

PAUL NASHAN, OF OBERHAUSEN, GERMANY, ASSIGNOR TO THE FIRM: GUTEHOFF-NUNGSHUTTE AKTIENGESELLSCHAFT, OF OBERHAUSEN, GERMANY

PROCESS FOR THE MANUFACTURE OF FORMALDEHYDE FROM METHANE

Application filed January 6, 1930, Serial No. 418,978, and in Germany November 15, 1928.

The synthesis of formaldehyde from methane and oxygen represents a problem the technical solution of which has frequently been attempted. The processes hitherto propounded have in most cases proved a failure, due to the fact that conversion was effected in but an incomplete measure, with the result that it was impossible to obtain yields with any degree of economy.

It has been proposed by way of example to conduct methane mixed with air over contacts consisting of copper and pumicestone, or a mixture of air and methane through a so-called ozonizator. Similarly it is known that methane may be oxidized by using bark as a contact at temperatures between 30 and 50 deg. Cent. According to another suggestion, it is proposed to bring the mixture of methane and oxygen, the latter predominating in the mixture, to reaction over a metal catalyst at 150 and 200 deg. Cent. It has also been proposed to use carbonic acid instead of oxygen, the carbonic acid being mixed with methane and conducted over a metal contact at a temperature of 500 to 700 deg. Cent.

The processes referred to did not find their way into practical use, due to the low yield not permitting them to be carried out with any degree of economy.

The new process is noteworthy on account of its being simple and economical in operation. According to the invention, a mixture of methane and oxygen is brought into the field of a high-frequency current of vary high voltage in which a vacuum is maintained and visible discharges are caused to take place, formaldehyde and water being immediately formed between the two poles. Reaction apparently takes place according to the formula:

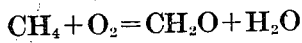

When catalysts, such as copper, silver or the like are present within the reaction room, an almost theoretical yield of formaldehyde is obtained, especially when using a vacuum. But even in the absence of catalyst, the yield is substantially increased by using a vacuum. The two gases, methane and oxygen, in addition to being employed in a pure state, may also be used mixed with other gases. Thus, coke gas, which contains about 25 per cent. of methane, may be used when mixed with air.

The drawing shows a device for carrying out the process.

1 is a high-frequency generator, 2 the transformer and 3 the produced high-frequency field in which a vacuum is maintained and to which the mixture of air and methane is conducted by the circuit 4. Air and methane flow through the pipes 5 and 6 into the pipe 4. After passing through the high-frequency field, the mixture enters the washer 7 into which washing liquor is admitted by the sprayer 8. The solution of formaldehyde is drawn off at the bottom of the washer in the container 9. The residual gas escapes at 10.

*Examples*

1. A mixture of 1 part of air and 1 part of methane is conducted through an electric field which is defined by high-frequency currents at a voltage of 80,000 and 400,000 cycles at a speed of 1 centimetre per second. 350 grammes of formaldehyde per cubic metre of methane may be washed out of the liberated gas.

2. An electric high-frequency field of 90,000 volts and 300,000 cycles is charged with copper oxide. A mixture of 1½ parts of air and 1 part of methane is conducted over the oxide of copper at a pressure of 200 millimetres of mercury and a speed of 2 centimetres per second. The liberated gas contains 480 grammes of formaldehyde per cubic metre of methane.

What I claim is:

1. Process for the manufacture of formaldehyde from methane and oxygen, consisting in conducting the two gases through an electric field in which visible discharges of a high frequency current of very high voltage are caused to take place, and maintaining a vacuum in the reaction room.

2. Process for the manufacture of formaldehyde from methane and oxygen, consisting in conducting the two gases through an electric field in which visible discharges of a high frequency current at a pressure of from 80,000 to 90,000 volts and from 300,000 to 400,000 cycles and simultaneously employing metallic catalysts in the reaction room.

PAUL NASHAN.